Aug. 1, 1967    G. S. HARTLEY ETAL    3,333,745
ADJUSTABLE METERING VESSEL FOR THE INTERMITTENT
DISCHARGE OF GRANULES
Filed March 9, 1966    2 Sheets-Sheet 1

INVENTORS
GILBERT SPENCER HARTLEY
ALEXANDER ALLAN ROSS

ATTORNEYS

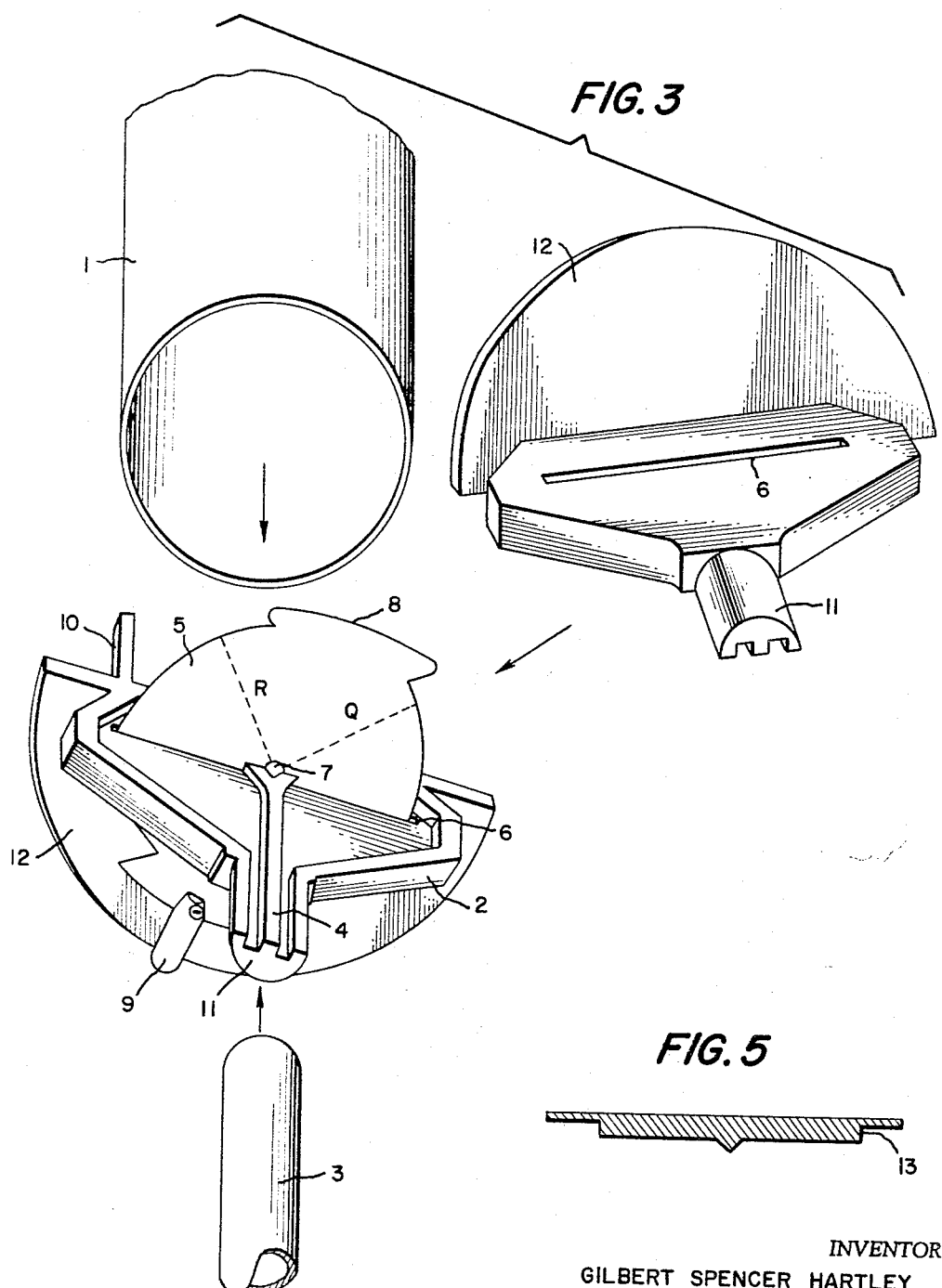

United States Patent Office 3,333,745
Patented Aug. 1, 1967

3,333,745
ADJUSTABLE METERING VESSEL FOR THE INTERMITTENT DISCHARGE OF GRANULES
Gilbert Spencer Hartley, Fulbourn, and Alexander Allan Ross, Newport, England, assignors to Fisons Pest Control Limited, Harston, England
Filed Mar. 9, 1966, Ser. No. 532,923
Claims priority, application Great Britain, July 1, 1965, 27,835/65
8 Claims. (Cl. 222—424.5)

The present invention relates to an improved apparatus for the intermittent discharge of granular products.

Many chemicals for use in agriculture are conveniently applied in granular form, and in many cases accurate localised application, for example at the base of a plant, is required. For economy such an apparatus requires to be capable of use with more than one material, and consequently requires to be provided with means to vary the dose delivered on each discharge. Such apparatus comprises supply means for the granular product, a metering vessel and a discharge tube. It has been found that the metering vessel hereinafter described provides a simple means to deliver discrete volumes on a target, which is capable of adjustment so as to be able to deliver doses at more than one rate.

Accordingly the present invention is for a metering vessel for use in an apparatus for the intermittent discharge of granules which is adapted to be connected with a supply means and a substantially rigid discharge tube, the metering vessel comprising at the point of connection with the supply means one or two conduits substantially at right angles to the axis of the discharge tube, the conduits continuing in this direction for a distance greater than the radius of the discharge tube, then turning back at 180° for substantially the same distance, and at this point adapted to be connected substantially at right angles with the discharge tube, wherein the conduits in the metering vessel are formed by a vessel divided by a baffle plate substantially at right angles to the axis of the discharge tube, said baffle plate being rotatable and having varying functional radial lengths so as to permit variation in the capacity of the conduit at the turning back point. Obviously the conduits must continue sufficiently in the direction at right angles to the axis of the discharge tube to prevent continuous run-through of granules. According to one embodiment of the invention the baffle plate is of greater area than the adjacent cross-section of the vessel and extends through slots provided in the walls of the vessel.

According to a preferred embodiment, the metering vessel comprises two symmetrical conduits lying in the same plane on opposite sides of the axis of the discharge tube.

It is preferred that the baffle plate is substantially parallel to the greatest dimension of the vessel. Very suitably the vessel is of substantially trapezoidal shape, the parallel sides being at right angles to the discharge tube, and the widest dimension adjacent to the discharge tube.

The metering vessel is suitably constructed of moulded plastic materials, for example by joining together two symmetrical parts moulded in plastic material, and preferably fitting flanges at the supply and discharge points into the supply and discharge tubes respectively.

Rotation of the baffle of varying functional radial lengths, varies the capacity of the conduits at the turning back point, and consequently the volume of each discrete discharge of granules.

The apparatus may be provided with a granule container remote from the metering vessel, for example shoulder mounted, which is connected to the metering vessel by a fixed tube with rotatable mounting or a flexible tube, permitting the rotation of the metering vessel. However, where relatively small amounts are involved, as with insecticides, the supply container may be adjacent to or integral with the metering vessel, so that the whole apparatus may be held in the hand.

In operation of the metering vessel according to the present invention, with the baffle in a pre-determined position, when the discharge tube is held obliquely with one conduit below its axis, this conduit fills with granules in the double bend but these granules cannot flow out since a granular solid, unlike a liquid, cannot flow upwards under the head of granules in the container. The tube is now quickly twisted about its axis through 180°. A portion of the granule contents of the double bend of the conduit now discharges and simultaneously the other conduit, if any, is charged.

If the vessel is provided with two opposite conduits, a metered volume of granules is discharged after every twist of the supply tube through 180°. If it is provided with one only, then the discharge occurs only after each alternate twist. In the use of the device as above described the twisting motion will be alternately clockwise and anti-clockwise for obvious conformity to the anatomy of the operator. Although it is essential that the conduit-containing metering vessels should undergo the twisting motion, it is not essential for the discharge tube to rotate, although the arrangement is simpler where it does so.

Where it is desired to change the volume delivered, this is achieved by rotation of the asymmetric baffle.

For a fuller understanding of the invention, reference is to be had to the accompanying drawings, which show, solely by way of illustration, various embodiments of the invention.

FIGURE 3 is a fragmentary sectional view of the metering vessel.

FIGURE 5 is a transverse section of FIGURE 4.

Figure 1:
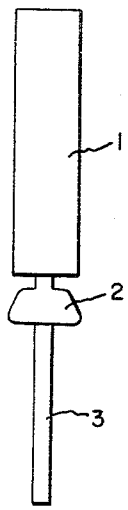
FIGURE 1 is a diagrammatic representation of the apparatus adapted to be held completely in the hand.
Figure 2:
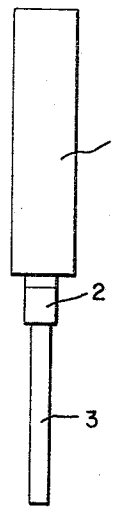
FIGURE 2 is a view at right angles to FIGURE 1.

The apparatus shown in FIGURES 1, 2 and 3 comprises the granule container 1, metering vessel 2 and discharge tube 3. Details of the metering vessel are shown in FIGURE 3, which is constructed by joining together two identical moulded parts.

The two identical parts of the metering chamber 2 are moulded with the T shaped inner member 4 having only a short transverse portion. The figure shows an isometric view of one half of the disassembled metering chamber. The baffle separating the conduits is formed by the metal disc 5 inserted through a thin transverse slot 6 in the outer wall of the moulding. The other half, shown above to the right, has a corresponding slot through which the upper part of the disc 5 passes when the assembly is complete. The disc bears a central conical pimple 7 which fits into a matching depression in the center of the stub transverse portion of the moulded T piece 4. When assembly is complete this pimple serves to locate the disc rotatably while the slot restrains longitudinal movement. The slots are too narrow to permit escape of granules to any significant extent.

The disc 5 is of shape symmetrical about one diameter but the diameter increases from a minimum indicated by the dotted line Q to a maximum as indicated at R, after the manner of a conventional linear displacement cam. The extended portion 8 provides stops to restrict the rotation. A handle 9 serves to enable the disc to be rotated by hand from outside the assembly between the limits set by engagement of 8 with the outer wall of the moulding. It will be obvious that this rotation permits adjustment of the functional length of the transverse portion of the T piece 4 and so controls the volume of granular material delivered.

The remote (upper) portion of the moulding is a cylinder 10 adapted to fit into the end of the supply container 1, the near (lower) portion 11 fitting into the delivery tube 3. These fitments serve also to hold together the two halves of the moulded metering chamber. The container 1 and delivery tube 3 are shown in the figure to the top left and bottom left respectively and for assembly the components shown separately are moved together in the direction indicated by the arrows.

It is convenient to mould a circular flange 12 on the upper portion of the chamber, to fit against the end of the container. This serves a dual purpose. It can carry graduations against which the position of the handle 9 can be recorded and it deflects rain water which may run down the container away from the moulding itself, so that seepage of water through the slots 6 carrying the disc 5 and into the chamber is reduced.

Figure 4:
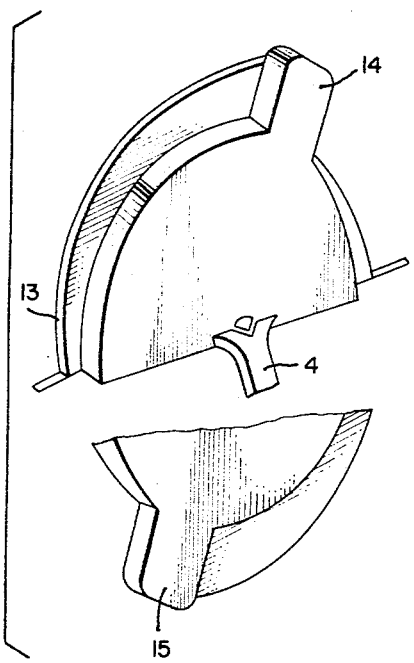
FIGURE 4 is a representation of an alternative baffle which may be used in the vessel shown in FIGURE 3.

A modification of the metering chamber illustrated in FIGURE 3 is shown in FIGURES 4 and 5.

This comprises the replacement of the metal disc 5 by a moulded plastic disc, with external lugs so that it can be inserted complete, without the need for a separate handle attached after assembly. This plastic disc 13 can be inserted in a metering chamber as in FIGURE 3. The center portion of the disc is circular and thickened and carries lugs 14 and 15 of the same thickness. With this disc, the wider central portion of the slot 6 is completely blocked by the disc. Preferably the thickened center portion is thickened unilaterally so that the disc can only be inserted in the correct sense for matching with any graduations showing delivery rates.

Figure 6:
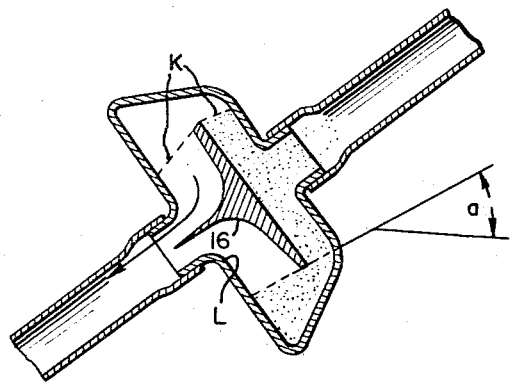
FIGURE 6 is a vertical section of a metering vessel showing this in an oblique position corresponding to the position in use.

FIGURE 6 is given to show the operation of a metering vessel, for example as shown in the other figures.

The external walls of the vessel are of generally trapezoidal form, the longer side of the trapezoid being on the discharge side. The vessel is divided into two channels by the baffle 16 shown in rudimentary form. The vessel is completed by walls parallel to and above and below the plane of the section on which FIGURE 6 is taken, so that a section through the vessel and perpendicular to the axis of the discharge tube is rectangular, but it could be of circular or elliptical form and the internal edges are preferably rounded to ensure easy flow of the granules.

Granules are shown diagrammatically in the position occupied after the contents of the region above the dotted lines K has been discharged in the direction of the arrow. The corresponding volume in the opposite channel has been filled up by gravity flow and is ready to be discharged when the device has been twisted through 180° about the axis of the supply tube. The volume so discharged is dependent on the capacity between the end of the baffle 16 and the wall of the vessel, and also to some extent on the angle of repose of the granule mass, this angle being denoted as $a$ in the figure. The proportion of the granule contents retained behind the baffle 16 and above its upper end is similarly dependent on the flow properties of the granules. It is for this reason that the outer walls of the metering vessel are made in the trapezoidal pattern shown, the greater part of the volume to be discharged being therby made independent of the variation in angle of repose. It will be understood that the volume discharged on each occasion will also depend to some extent on the inclination of the supply tube to the horizontal. It has been shown however that an apparatus constructed as herein described supplies volumes sufficiently reproducible for the intended purpose over reasonable variations of the inclination of the supply tube and deviation from verticality of the main plane of the metering vessel.

The limitations and latitudes on the design will now be evident. The line L in FIGURE 6, joining the lowest point of the baffle 16 and the highest point of the bottom of the discharge hole, must clearly not slope downwards to the left for any probable inclination of the supply tube, otherwise the granules in the lower metering cavity could dribble out when not intended. Further the minimum dimension in the cross section of any of the channels must be great enough not to cause obstruction to the flow of granules when desired. Obviously therefore this dimension must be greater than the greatest dimension of any granule present, and, according to the accepted standards for non-bridging of granular solids, must be at least three times the largest dimension of any granules present in significant quantity. No difficulty has been found in meeting these requirements in practice with an adequate additional margin of safety.

There is no physical reason why the channels which the granules first enter in the vessel should be straight and perpendicular to the supply tube. They could slope towards the discharge end and the flate side of the T-shaped baffle could correspondingly be of obtuse triangular form. The shape shown is preferred for simplicity of construction and economy of material. The discharge halves of the metering channels also need not be colinear. They could be turned through a small angle in the same or opposite directions with respect to the axis of the supply halves and could therefore be arranged to discharge separately, without loss of granules from one to the other, without extension of the baffle as shown into the entrance to a separate discharge tube. The form shown is again preferred on grounds of simplicity of construction rather than physics of operation.

To test the reproducibility of metering under varying conditions of use the following experiments were carried out using typical commercial granules.

| Inclination of supply tube to horizontal, degrees | Inclination of plane of metering vessel to vertical, degrees | Volume of 20 discharges, ml. |
|---|---|---|
| 30 | 0 | 11.0 |
| 45 | 0 | 11.5 |
| 60 | 0 | 11.1 |
| 45 | 30 | 10.2 |

Ten separate discharges for the 45°, 0° disposition were then recorded: 0.69, 0.76, 0.76, 0.82, 0.70, 0.67, 0.77, 0.76, 0.68, 0.70 gm.

The extreme variation here is 12% above the mean of 0.73 gm. and represents more than sufficient accuracy for the intended purpose.

We claim:

1. A metering vessel for use in an apparatus for the intermittent discharge of granules which is adapted to be connected with a supply means and a substantially rigid discharge tube, the metering vessel comprising at the point of connection with the supply means not more than two conduits substantially at right angles to the axis of the discharge tube, the conduits continuing in this direction for a distance greater than the radius of the discharge tube, then turning back at 180° for substantially the same distance, and at this point adapted to be connected substantially at right angles with the discharge tube, wherein the conduits in the metering vessel are formed by a vessel divided by a baffle plate substantially at right angles to the axis of the discharge tube, said baffle plate being rotatable and having varying functional radial lengths so as to permit variation in the capacity of the conduit at the turning back point.

2. A metering vessel as claimed in claim 1 wherein the baffle plate is of greater area than the adjacent cross-section of the vessel and extends through slots provided in the walls of the vessel.

3. A metering vessel as claimed in claim 1 wherein the metering vessel comprises two symmetrical conduits lying in the same plane on opposite sides of the axis of the discharge tube.

4. A metering vessel as claimed in claim 1 wherein the baffle plate is substantially parallel to the greatest dimension of the vessel.

5. A metering vessel as claimed in claim 1 wherein the vessel is of substantially trapezoidal shape, the parallel sides being at right angles to the discharge tube, and the widest dimension adjacent to the discharge tube.

6. A metering vessel as claimed in claim 1 constructed of moulded plastic material.

7. A metering vessel as claimed in claim 1 constructed by joining together two symmetrical parts moulded in plastic material.

8. A metering vessel as claimed in claim 1 constructed by joining together two symmetrical parts moulded in plastic material by fitting flanges at the supply and discharge points into the supply and discharge tubes respectively.

References Cited

UNITED STATES PATENTS

| | | | |
|---|---|---|---|
| 547,334 | 10/1895 | Cram | 222—456 |
| 999,148 | 7/1911 | Bostrom | 222—353 X |
| 3,010,610 | 11/1961 | Marshall et al. | 222—410 X |

FOREIGN PATENTS 199,143  10/1965  Sweden.

ROBERT B. REEVES, *Primary Examiner.*

KENNETH N. LEIMER, *Assistant Examiner.*